US008237299B2

(12) United States Patent
Andrews

(10) Patent No.: US 8,237,299 B2
(45) Date of Patent: Aug. 7, 2012

(54) POWER GENERATION SYSTEMS, PROCESSES FOR GENERATING ENERGY AT AN INDUSTRIAL MINE SITE, WATER HEATING SYSTEMS, AND PROCESSES OF HEATING WATER

(76) Inventor: Larry Andrews, Spokane, WA (US)

( * ) Notice: Subject to any disclaimer, the term of this patent is extended or adjusted under 35 U.S.C. 154(b) by 501 days.

(21) Appl. No.: 12/492,741

(22) Filed: Jun. 26, 2009

(65) Prior Publication Data
US 2010/0327605 A1 Dec. 30, 2010

(51) Int. Cl.
*B60L 1/02* (2006.01)
*F01K 15/00* (2006.01)
*F01K 17/02* (2006.01)
*F02C 6/00* (2006.01)
*F02C 6/18* (2006.01)
*F01K 17/00* (2006.01)
*F01K 25/08* (2006.01)

(52) U.S. Cl. .................. 290/2; 60/648; 60/651
(58) Field of Classification Search ........ 290/2; 60/648, 60/651
See application file for complete search history.

(56) References Cited

U.S. PATENT DOCUMENTS

| 3,479,817 | A | * | 11/1969 | Minto | 60/671 |
| 3,795,103 | A | * | 3/1974 | Anderson | 60/651 |
| 3,846,986 | A | * | 11/1974 | Anderson | 60/641.2 |
| 4,209,992 | A | | 7/1980 | Chih-Kang | 60/651 |
| 4,321,799 | A | * | 3/1982 | Pierotti et al. | 62/112 |
| 4,444,015 | A | * | 4/1984 | Matsumoto et al. | 60/648 |
| 4,467,609 | A | * | 8/1984 | Loomis | 60/651 |
| 4,603,554 | A | * | 8/1986 | Lagow | 60/670 |
| 4,693,087 | A | * | 9/1987 | Lagow | 60/670 |
| 4,760,705 | A | * | 8/1988 | Yogev et al. | 60/651 |
| 4,864,826 | A | * | 9/1989 | Lagow | 60/670 |
| 4,876,855 | A | * | 10/1989 | Yogev et al. | 60/651 |
| 6,397,600 | B1 | * | 6/2002 | Romanelli | 60/671 |
| 6,523,366 | B1 | * | 2/2003 | Bonaquist et al. | 62/613 |
| 6,594,997 | B2 | * | 7/2003 | Romanelli | 60/651 |
| 6,691,514 | B2 | | 2/2004 | Bushey | 60/651 |
| 6,960,839 | B2 | * | 11/2005 | Zimron et al. | 290/2 |
| 7,225,621 | B2 | * | 6/2007 | Zimron et al. | 60/651 |
| 7,340,897 | B2 | * | 3/2008 | Zimron et al. | 60/641.1 |
| 7,493,763 | B2 | * | 2/2009 | Klochko et al. | 60/641.7 |
| 7,663,256 | B2 | * | 2/2010 | Yuri et al. | 290/2 |
| 7,823,386 | B2 | * | 11/2010 | Zimron et al. | 60/651 |
| 7,870,735 | B2 | * | 1/2011 | Romanelli et al. | 60/653 |
| 7,900,451 | B2 | * | 3/2011 | Amir et al. | 60/641.7 |
| 7,930,882 | B2 | * | 4/2011 | Yuri | 60/320 |
| 8,004,099 | B2 | * | 8/2011 | Yuri | 290/40 R |
| 8,024,929 | B2 | * | 9/2011 | Marnoch | 60/650 |
| 8,153,078 | B2 | * | 4/2012 | Bacik et al. | 422/292 |
| 2003/0070431 | A1 | * | 4/2003 | Romanelli | 60/649 |
| 2006/0236698 | A1 | * | 10/2006 | Langson | 60/651 |
| 2006/0236699 | A1 | * | 10/2006 | Klochko et al. | 60/671 |
| 2008/0092542 | A1 | * | 4/2008 | Graham | 60/651 |
| 2009/0045625 | A1 | * | 2/2009 | Yuri | 290/2 |
| 2009/0045626 | A1 | * | 2/2009 | Yuri | 290/2 |
| 2009/0107128 | A1 | * | 4/2009 | Yuri | 60/320 |

(Continued)

*Primary Examiner* — Pedro J Cuevas
(74) *Attorney, Agent, or Firm* — Wells St. John P.S.

(57) ABSTRACT

Power generation systems are provided that include a circular loop of conduit, a dehumidifier coupled to the conduit, a power turbine coupled to the turbine and a pump coupled to the conduit. Processes for generating energy at an industrial mine site are also provided. Water heating systems are provided that can include a dehumidifier associated with a conduit containing water, a holding tank coupled to the conduit and water heaters coupled to the holding tank. Processes of heating water are also provided.

12 Claims, 5 Drawing Sheets

U.S. PATENT DOCUMENTS

| | | | |
|---|---|---|---|
| 2009/0107129 A1* | 4/2009 | Yuri et al. | 60/320 |
| 2009/0108588 A1* | 4/2009 | Yuri et al. | 290/1 A |
| 2009/0127867 A1* | 5/2009 | Yuri | 290/40 R |
| 2009/0127868 A1* | 5/2009 | Yuri et al. | 290/40 R |
| 2009/0277400 A1* | 11/2009 | Conry | 123/2 |
| 2009/0283242 A1* | 11/2009 | Albers | 165/60 |
| 2010/0126172 A1* | 5/2010 | Sami | 60/651 |
| 2010/0327606 A1* | 12/2010 | Andrews | 290/1 R |
| 2011/0056822 A1* | 3/2011 | Elsharqawy et al. | 203/11 |
| 2011/0079504 A1* | 4/2011 | Govindan et al. | 203/11 |
| 2012/0019009 A1* | 1/2012 | Fong et al. | 290/1 R |
| 2012/0023940 A1* | 2/2012 | Kitz et al. | 60/641.2 |
| 2012/0031096 A1* | 2/2012 | Ulas Acikgoz et al. | 60/651 |
| 2012/0067036 A1* | 3/2012 | Fong et al. | 60/327 |
| 2012/0067047 A1* | 3/2012 | Peterson et al. | 60/651 |

* cited by examiner

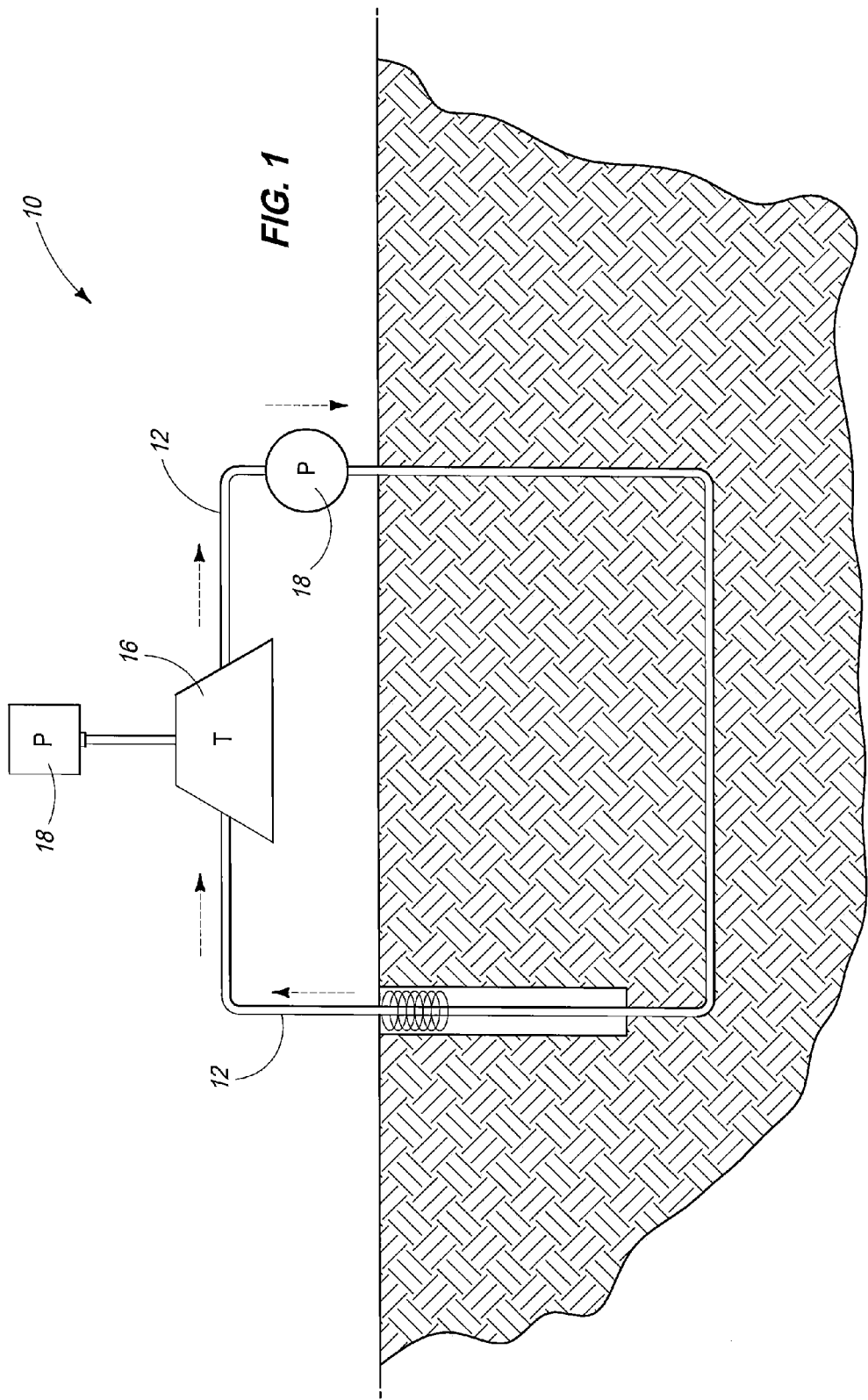

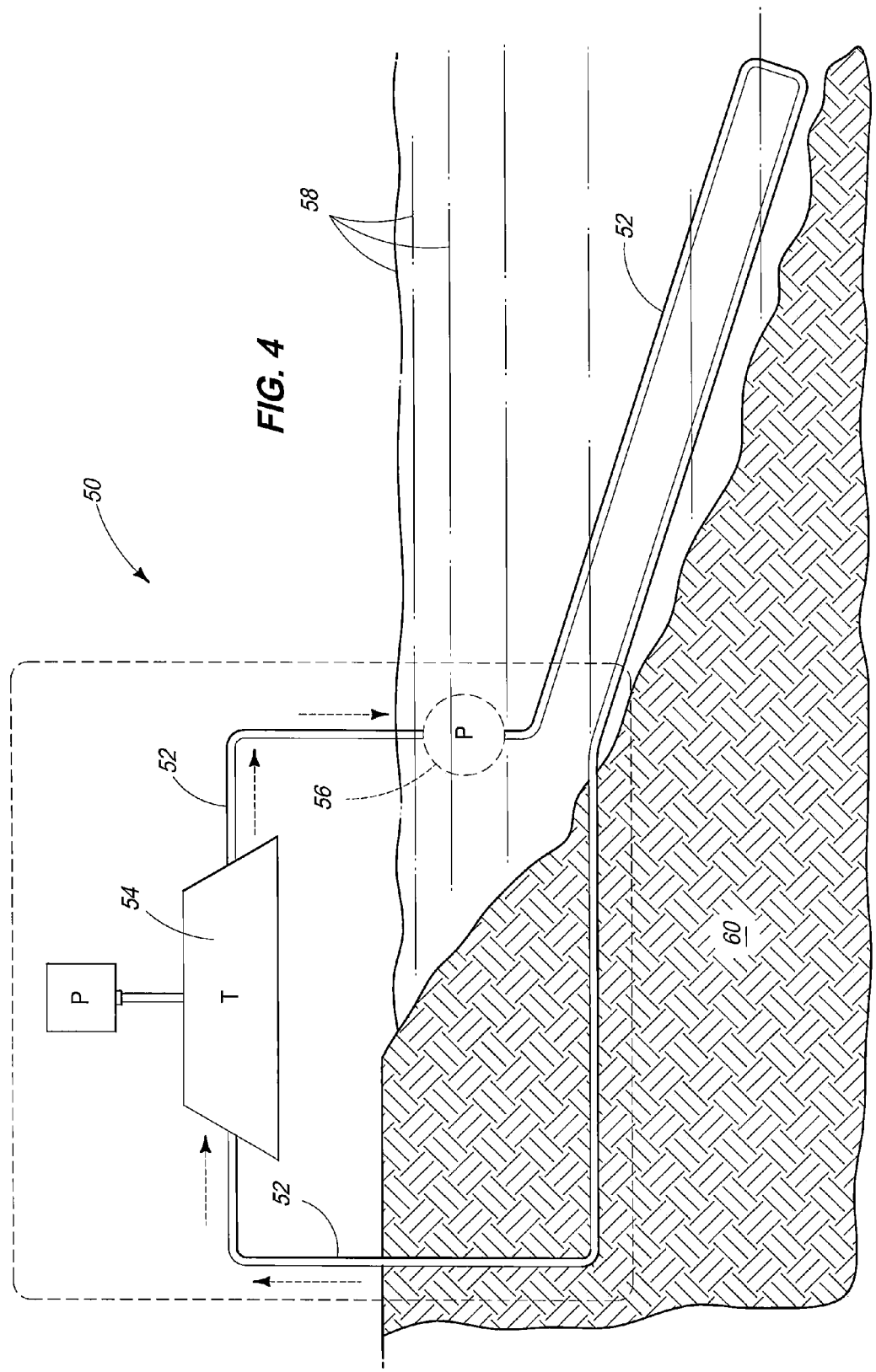

POWER GENERATION SYSTEMS, PROCESSES FOR GENERATING ENERGY AT AN INDUSTRIAL MINE SITE, WATER HEATING SYSTEMS, AND PROCESSES OF HEATING WATER

TECHNICAL FIELD

The present disclosure relates to power generation systems, processes for generating energy at an industrial mine site, water heating systems and processes of heating water.

BACKGROUND

At industrial sites it is becoming more important than ever to conserve on energy usage, and mining sites are no different. Mining sites utilize a vast amount of energy and there are many places that energy can be conserved and utilized for other sources. The present disclosure provides power generation systems, processes for generating energy at an industrial mine site, water heating systems and processes of heating water.

DRAWINGS

Embodiments of the disclosure are described below with reference to the following accompanying drawings.

FIGS. 1 and 1A are power generations systems according to embodiments of the disclosure.

FIG. 4 is a power generation system according to an embodiment.

SUMMARY

Figure 1A:
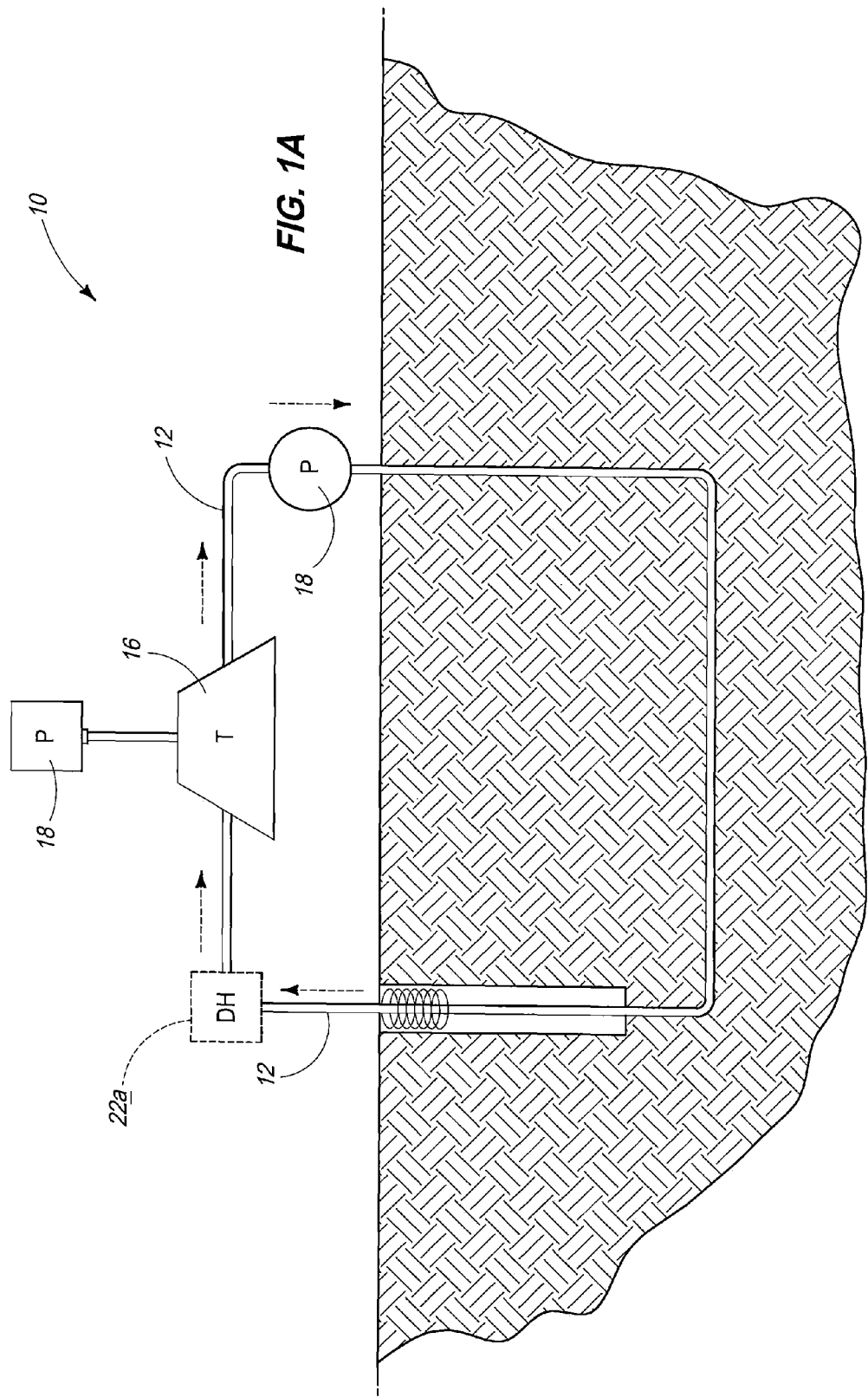

Power generation systems are provided that include a circular loop of conduit, a dehumidifier coupled to the conduit, a power turbine coupled to the turbine and a pump coupled to the conduit. Processes for generating energy at an industrial mine site are provided that include providing an expanding fluid to the exhaust of the dehumidifier allowing the fluid to expand and drive a power turbine condensing the fluid and returning the fluid to the exhaust of the dehumidifier.

Water heating systems are provided that can include a dehumidifier associated with a conduit containing water, a holding tank coupled to the conduit and water heaters coupled to the holding tank.

Processes of heating water are provided with the processes including providing a tank from a dehumidifier to water within a conduit coupled to a water storage tank and utilizing the water within the conduit as a source of water to be heated by a hot water heater.

DESCRIPTION

This disclosure is submitted in furtherance of the constitutional purposes of the U.S. Patent Laws "to promote the progress of science and useful arts" (Article 1, Section 8).

The present disclosure provides systems and processes that are described with reference to FIGS. 1-4. Referring first to FIG. 1, a power generation system 10 is disclosed that may be utilized at an industrial mine site, for example. According to example implementations, the system can include a circular loop of conduit 12 that coupled to as well as a power turbine 16 and a pump 18. According to example implementations, power turbine 16 can be located above ground, for example. Conduit 12 may contain an expanding fluid such as a refrigerant. That expanding fluid can be referred to as a hydrofluorocarbon or a hydrochlorofluorocarbon. Example expanding fluids can include HFC-32, HFC-125 and HCFC-22, for example. Other fluids such as those utilizing the commercial R-410A moniker may be utilized as well.

According to example implementations, the expanding fluid via conduit 12 can be provided to within the mine site and more particularly to within a mine exhaust conduit. The fluid can be allowed to expand while proximate the site or exhaust conduit and continue along conduit 12 to drive power turbine 16, the fluid can then be pumped and condensed and the fluid can be returned to the site or proximate exhaust utilizing pump 18, for example.

Turbine 16 can be a low pressure turbine. Turbine 16 can be an expansion turbine configured to utilize fluids described herein. Turbines of the present disclosure can be pressure differential turbine, for example, such as a turbine that takes advantage of the expansive nature of a fluid. Example turbines include those turbines that can utilize the vapor pressure exhibited by a fluid when transitioning from the liquid state to the gaseous state. Example turbines can include low pressure turbines. Turbine suitable for utilization in the systems and methods of the present disclosure can include the BP-50 series offered by Trigen Ewing Power of Turner Falls Mass. These turbines can be purchased to utilize steam expansion but can easily be retrofitted with seals to allow for the use of refrigerant expansion such as the fluids described herein.

Pump 18 can be a commercially available refrigerant pump chosen to convey the fluid designed to be conveyed by the system. The system can include coils to facilitate exposure to mine conditions at the exhaust or within the mine site. These coils can be direct expansion coils and/or evaporator coils.

Figure 2:
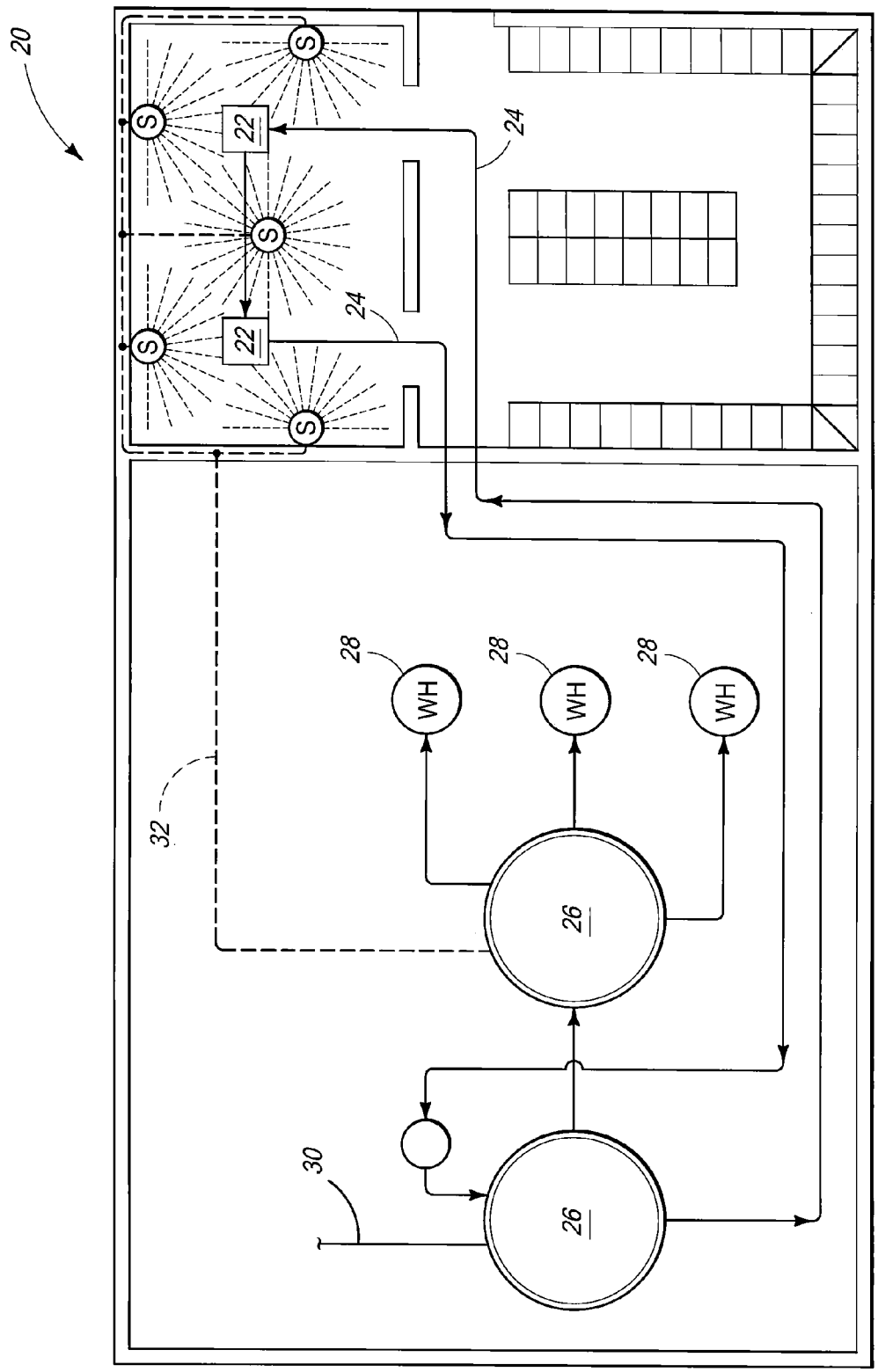
FIG. 2 is a hot water heating system according to an embodiment.

Referring next to FIG. 2 a hot water heating system 20 is shown that includes dehumidifiers 22 associated with a conduit 24 and coupled to holding tanks 26. According to example implementations, water within conduit 24 can be provided proximate the exhaust of dehumidifier 22 via conduit 24. According to example implementations, the heat from the exhaust of the dehumidifier can alter the temperature of the water within the conduit, thereby also removing heat from the shower portion of the locker room. This water then can be provided to holding tank 26 and utilized as water to be provided to water heaters 28. This heated water can be mixed with cold intake water 30. According to example implementations, the heat generated by dehumidifiers 22 can be utilized to heat water which can be utilized as the hot water for the showers of the locker room.

The heated water can be provided to the showerheads via conduit 32. Commercially available holding tanks and conduits as well as dehumidifiers and hot water heaters may be utilized to configure the system. The size and is design dependant primarily on the quantity of water to be heated and/or the size of the shower room to be dehumidified.

Figure 3:
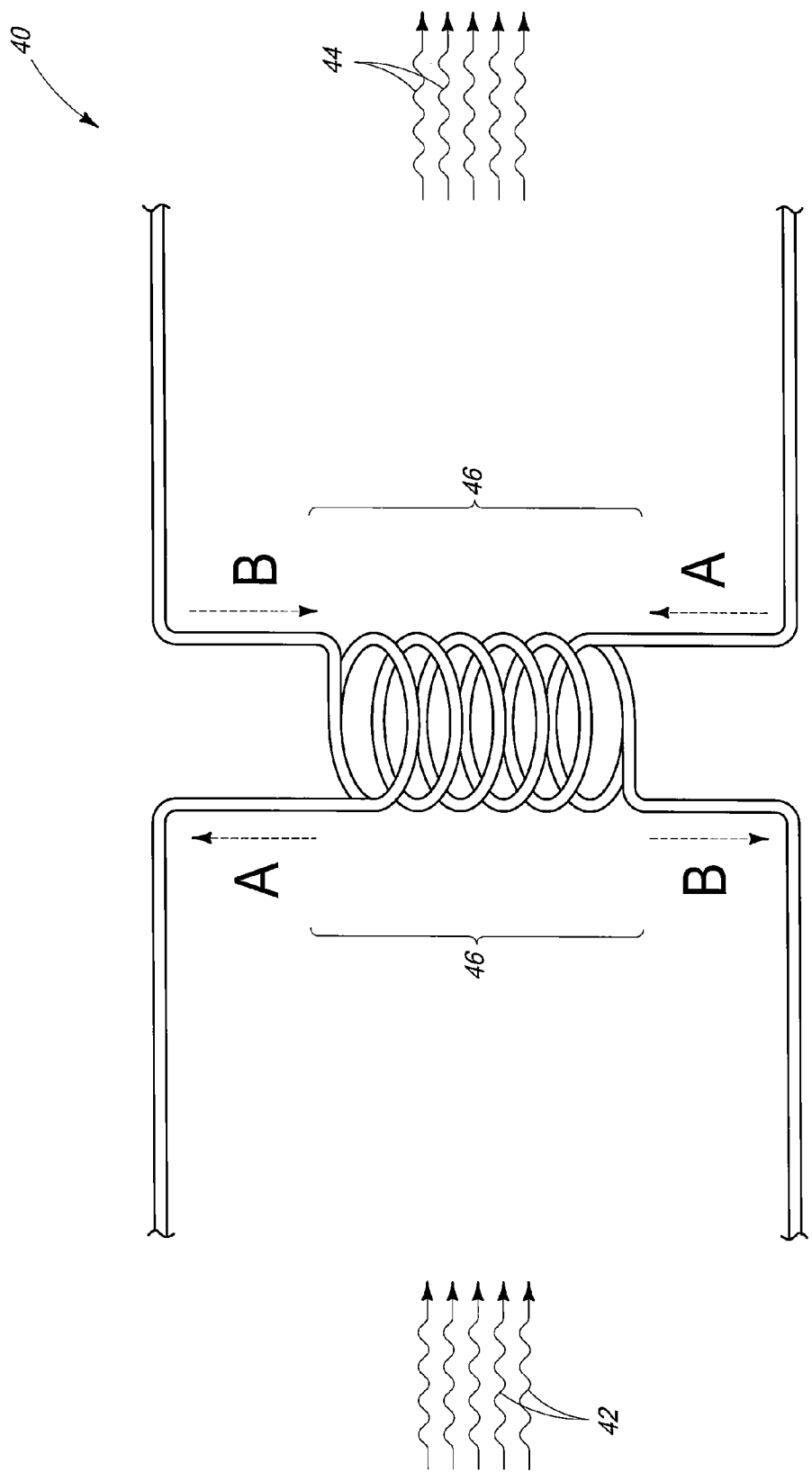
FIG. 3 is a component of the system of FIG. 2 according to an embodiment.

Referring to FIG. 3, and embodiment of coiled system 40 that can be utilized in combination with the systems described is shown. Air of a specific temperature can be provided as intake 42 and exhaust 44. System 40 can be aligned to receive intake 42 across double coiled heat exchange assembly 46 and allow exhaust 44 to exit. Accordingly intake 42 may have a temperature higher than exhaust 44. The assembly can be configured to convey two fluids, both fluids having different expansion characteristics. For example, one fluid may have the expansion characteristics of a refrigerant and the other the expansion characteristics of water.

According to example implementations, water can be provided in "A" and proximate a refrigerant provided in "B". The water within "A" can be warmed as it is exposed to intake 44. Likewise the refrigerant provided within "B" can be warmed as well. Accordingly, the warmed water may be utilized as for domestic and/or commercial hot water purposes. The warmed refrigerant, now expanded, can be utilized to drive an expansion turbine as shown in FIG. 1A, for example.

Referring to FIG. 4 a power generation system 50 for utilization near bodies of water is depicted. System 50 can include a continuous loop of conduit 52 having expansion turbine 54 and pump 56 coupled therebetween. In accordance with example implementations, a portion of loop 52 can reside or be in physical contact with water 58 while another portion of loop 52 resides or is in physical contact with earth 60. In accordance with example implementations, fluid as exemplified herein, may be cycled through loop 52 to expand and/or condense as the temperature difference between the water and soil dictate. As an example, where the water is substantially cooler than the soil, the fluid can be provided from the water to the soil where the fluid expands and drives the expansion turbine. Where the water is substantially warmer than the soil, the fluid can be provided from the soil to the water where it expands and drives the expansion turbine.

While pump 56 is represented between turbine 54 and the portion of loop 52 associated with the water, this is not necessary for all cycling or configuration of system 50. Additional pumps not shown may be utilized in system 50. For example, system 50 can be configured to have multiple pumps and/or a pump in a different location than shown. Implementations of system 50 can include providing pumps between turbine 54 and the portion of loop 52 associated with soil 60, for example. Other implementations can include providing pumps on both side of turbine 54. The direction of pressure differential of the pumps is consistent with the direction of fluid in loop 52. FIG. 4 depicts the direction of fluid in one direction; however the invention cannot be limited to directed fluid in this direction alone. The fluid may be directed in the opposing direction as well.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

What is claimed is:

1. A power generation system, the system comprising:
   a circular loop of conduit containing an expanding fluid, the fluid flowing in a direction through the conduit and establishing a stream of flow through the conduit;
   a dehumidifier coupled to the conduit;
   a power turbine coupled to the conduit downstream of the dehumidifier; and
   a pump coupled to the conduit along the loop between the power turbine and the dehumidifier.

2. The system of claim 1 wherein the system is associated with an industrial mine operation.

3. The system of claim 2 wherein the dehumidifier is located within the mine.

4. The system of claim 2 wherein the power turbine is located above ground.

5. A process for generating energy at an industrial mine site, the process comprising:
   via a conduit, providing an expanding fluid to the exhaust of a dehumidifier;
   within the conduit, allowing the fluid to expand after being provided to the exhaust of the dehumidifier and then drive a power turbine;
   receiving the fluid from the power turbine and condensing the fluid; and
   returning the fluid to the exhaust of the dehumidifier via the conduit.

6. The process of claim 5 wherein the expanding fluid is a refrigerant.

7. The process of claim 5 wherein the expanding fluid is a hydrofluorocarbon.

8. The process of claim 5 wherein the expanding fluid is a hydrochlorofluorocarbon.

9. A power generation system, the system comprising:
   a length of one conduit containing an expansive fluid, the fluid flowing in a direction through the one conduit and establishing a stream of flow through the one conduit;
   a dehumidifier having another conduit that is thermally associated with the one conduit;
   a power turbine in fluid connection with the one conduit downstream of the dehumidifier;
   a pump in fluid connection with the one conduit between the power turbine and the dehumidifier; and
   a condensing zone thermally associated with the one conduit and located between the power turbine and the dehumidifier along the one conduit.

10. The power generation system of claim 9 further comprising another dehumidifier.

11. The power generation system of claim 9 wherein the thermal association of the dehumidifier and the one conduit comprises intertwining the one conduit with the other conduit of the dehumidifier.

12. The power generation system of claim 9 wherein the condensing zone is located below ground level.

* * * * *